April 5, 1955
H. R. GIBBONS
2,705,666
CAGE FOR ANTIFRICTION BEARINGS
Filed Feb. 29, 1952
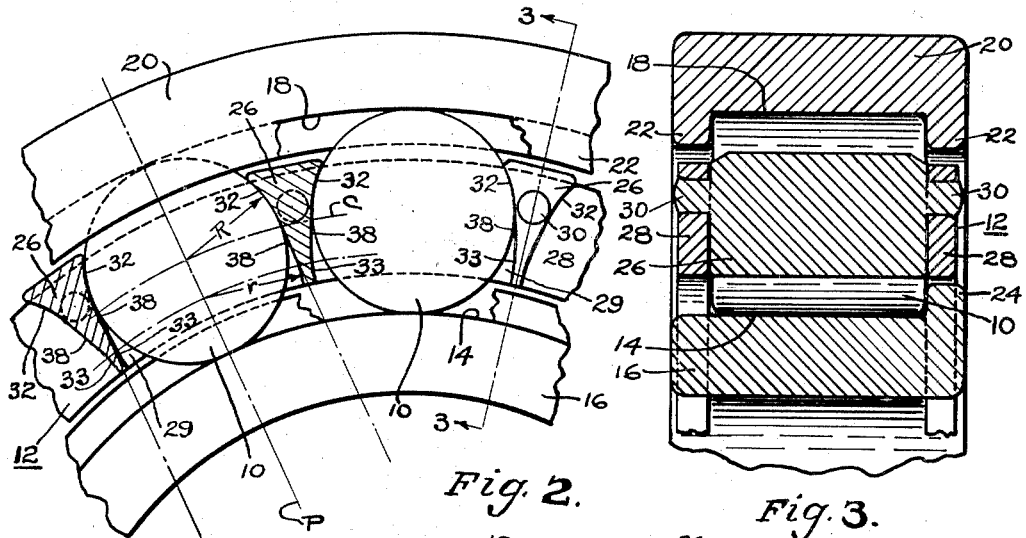
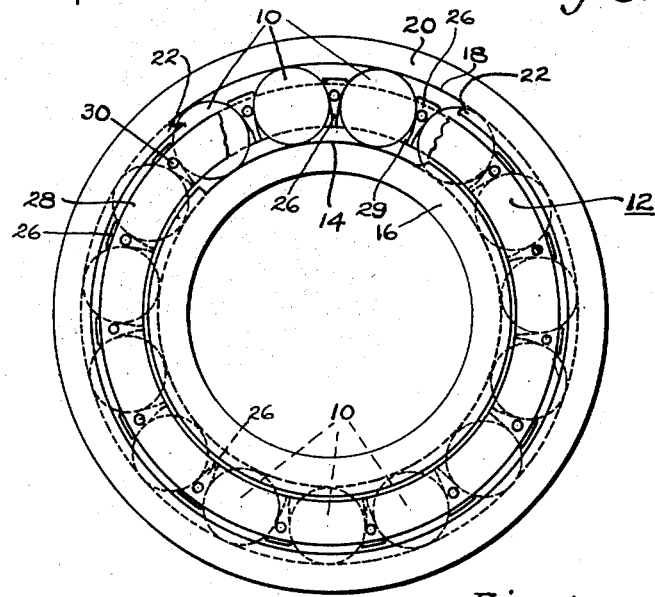
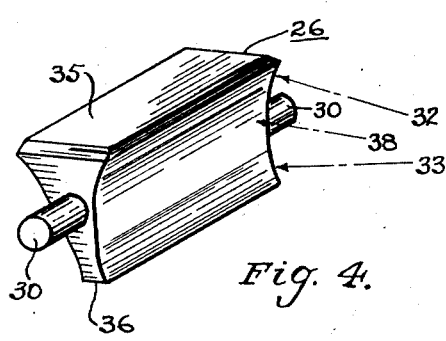
INVENTOR:
HAROLD R. GIBBONS,
BY Edward H. Goodrich
HIS ATTORNEY.

United States Patent Office 2,705,666
Patented Apr. 5, 1955

2,705,666

CAGE FOR ANTIFRICTION BEARINGS

Harold R. Gibbons, Chatham, N. J., assignor to General Motors Corporation, Detroit, Mich., a corporation of Delaware Application February 29, 1952, Serial No. 274,244

8 Claims. (Cl. 308—213)

This invention relates to cages for guiding the rolling elements in antifriction bearings and particularly to an improved cage wherein the rolling elements may be demountably positioned in a bearing raceway while in unit-handling relation with a cage.

In antifriction bearings, such as roller bearings, it is common practice to provide one of the race rings with a roller-receiving raceway between a pair of annular shoulders that limits the endwise movements of the rollers. The cage which guides the rollers in spaced relation in such a raceway does not usually secure the rollers in the roller-receiving cage pockets since each roller must be moved through a considerable distance radially of the bearing to pass by one of these annular shoulders during assembly and disassembly of the bearing. With this arrangement, assembly of the bearing is inconvenient and slow since the rollers must be individually inserted into the cage pockets and may lose position during further assembly of the bearing.

It is an object of this invention to provide an improved cage for rolling elements and which may be demountably assembled as a unit past a shoulder on an antifriction bearing while in assembled relation with rolling elements.

A further object is to provide an improved cage of simple inexpensive construction which will hold a series of spaced rolling elements in unit-handling relation therewith.

To these ends and also to improve generally upon devices of this character, this invention consists in the various matters hereinafter described and claimed. In its broader aspects, the invention is not necessarily limited to the specific structures selected for illustrative purposes in the accompanying drawings wherein Figure 1 is a side elevation of a roller bearing having the improved cage.

Figure 2 is an enlarged fragmentary side elevation showing the cage in operative position.

Figure 3 is a cross sectional view taken along the lines 3—3 of Figure 2.

Figure 4 is a perspective view of one of the bridge members of the improved cage.

A series of circumferentially spaced rolling elements 10 guided by my improved cage 12 are in rolling engagement with an annular raceway 14 on an inner race ring 16 and in rolling engagement with an annular raceway 18 on an outer race ring 20 to provide for relative antifrictional rotation of these race rings. In the illustrated disclosure, the rollers are cylindrical and the raceway surfaces are cylindrical. One of these race rings, as the outer race ring 20, has at each side of its raceway an annular shoulder 22 extending radially towards the other race ring. These shoulders 22 are spaced apart at a distance slightly exceeding the length of the rollers and limit the extent of axial movement of the rollers. Also, if desired, the other race ring, herein shown as the inner race ring may have at one end of its raceway an annular shoulder 24 for engagement with the rollers at one end.

The improved cage 12 has a series of uniformly and circumferentially spaced similar bridge members 26 permanently secured to and between a pair of similar end rings 28 that are located between and radially spaced from the race rings. The bridge members and end rings cooperatively form peripherally spaced roller-receiving pockets 29 wherein the rollers are held in unit-handling relation with the assembled cage 12 for freely rolling engagement on the raceways 14 and 18. Each bridge member 26, which is generally triangularly shaped in cross section, has flat end faces abutting the flat inner faces of the end rings 28, these parts being rigidly held together by studs 30 projecting endwise from the bridge members through holes in the end rings 28 and headed over against the outer faces of these end rings.

The side of each bridge member 26 which forms a part of a roller-receiving pocket 29 has a pair of lateral projections having spaced arcuate faces 32 and 33 respectively extending inwardly of the bridge member from top and bottom bridge member faces 35 and 36, and these arcuate faces merge with an intermediate flat bridge member wall or face 38. The opposed intermediate bridge member faces 38 of each pocket 29 are spaced apart through a distance slightly exceeding the diameter of a roller so that the roller will not bind therebetween, and these opposed faces 38 are substantially parallel to a radial plane P common to the roller and to the race rings 16 and 20. The opposed corresponding arcuate faces 32, 32 of each pocket and the opposed corresponding arcuate pocket faces 33, 33 extend sufficiently towards each other to retain each roller within its pocket even when the cage and roller assembly is disassociated from the race rings. Also, the length of each face 38 in a direction generally radially of the cage 12 is as great as and preferably exceeds the radial depth of the shoulder 22 to the raceway 18.

The cage 12 is supported between and in radially spaced relation from both race rings 16 and 20 by the pairs of opposed smooth arcuate pocket faces 32 riding upon the intervening rollers in the loaded zone of the bearing. The radius R of these opposed faces 32, which slightly exceeds the radius of the roller 10 therebetween to prevent binding of the rollers in their pockets 29, is swung from an axis on or adjacent to the pitch circle C of the rollers, and this radius R is preferably swung from the intersection of this pitch circle with the plane P common to the pocketed roller 10 and to the race rings. During the operation of a bearing equipped with this improved cage, the rapidly rotating cage, under the influence of centrifugal force, will ride very lightly upon the rollers 10 in the presence of suitable bearing lubricant. The opposed arcuate faces 33 at the bottom of each pocket 29 are provided with a radius $r$ that may be equal to or slightly greater than the roller radius. In each pocket 29, the axis of this radius $r$ is spaced radially of the cage through a sufficient distance from the axis of the outer radius R so that in assembling or disassembling a bearing the rollers 10 may be moved sufficiently between the opposed pocket faces 38 to axially insert or remove these rollers past the race ring shoulders 22 while the cage and rollers remain a unit-handling assembly.

I claim:

1. In a device of the character indicated, a pair of relatively rotatable race rings, circumferentially spaced rolling elements therebetween, one of the race rings having an annular shoulder at one side of the rolling elements, a cage between the race rings having an annular portion provided with a plurality of circumferentially spaced pockets respectively receiving said rolling elements, cage projections laterally extending toward each other at the tops and the bottoms of said pockets and holding the rolling elements within the pockets in unit-handling assembly with the cage, said cage being supported in radially spaced relation to both race rings by engagement of the cage projections with the rolling elements, and the cage projections at the side of each pocket being spaced from each other radially of the cage through a distance exceeding the radial depth of said shoulder to permit passage of the rolling elements past said shoulder while the rolling elements remain in assembled relation with the cage.

2. In a device of the character indicated, a pair of race rings, circumferentially spaced rolling elements therebetween, one of said race rings having a pair of spaced annular shoulders between which the rollers are received, a cage between the race rings and having an annular portion provided with a series of peripherally spaced pockets respectively receiving said rollers, a pair of cage projections laterally extending towards each other at the top of each pocket and engaging the rollers to support the cage in spaced relation to both race rings, a pair of cage projections laterally extending towards each other at the bottom of each pocket, said cage projections securing the rollers and cage in unit-handling relation, and parallel side walls on the cage extending between the top and bottom projections in each pocket for guiding said rollers, the parallel side walls of each pocket being laterally spaced from each other through a distance slightly exceeding the roller diameter and extending radially of the cage through a distance exceeding the radial depth of one of said annular shoulders.

3. In a device of the character indicated, a pair of coaxial race rings one of which has a pair of spaced annular shoulders, circumferentially spaced rolling elements between the race rings and between said shoulders, a cage between the race rings, an annular cage portion provided with a series of peripherally spaced pockets respectively receiving said rollers, a pair of cage projections extending towards each other at the top of each pocket, said cage projections generally conforming with and engaging the rollers and locating the cage in radially spaced relation to both of the race rings, a pair of cage projections extending toward each other at the bottom of each pocket, all of said projections holding the rollers in unit-handling relation with the cage, a pair of intermediate spaced flat side walls for guiding each roller and respectively connecting the cage projections at the side of each pocket and said side walls extending radially of the cage through a distance exceeding the radial depth of said annular shoulders.

4. In a cage for peripherally spacing rollers for rolling engagement with a pair of race rings one of which has a pair of annular shoulders for receiving the rollers therebetween, said cage having an annular portion provided with a series of peripherally spaced roller-receiving pockets, a pair of cage projections laterally extending towards each other at the top of each pocket, arcuate roller engaging faces on the cage projections for supporting said cage, said arcuate faces closely approximating the peripheral curvature of the roller, a pair of cage projections laterally extending towards each other at the bottom of each pocket, the cage having at each side of each pocket a flat intermediate wall merging with one of said arcuate roller engaging faces and extending radially of the cage into merging relation with the projections at the bottom of said pocket, the intermediate flat walls of each pocket being spaced apart through a distance slightly exceeding the diameter of the roller therebetween and being disposed parallel to a radial plane common to both race rings and common to the roller between said intermediate flat walls.

5. In a cage for peripherally spacing rollers for rolling engagement with a pair of race rings one of which has a pair of annular shoulders between which the rollers are received, said cage having an annular portion provided with a series of peripherally spaced roller-receiving pockets, a pair of cage projections extending laterally towards each other at the top of each pocket, arcuate roller engaging faces on said cage projections and supporting the cage in radially spaced relation to both race rings, a pair of cage projections extending laterally towards each other at the bottom of each pocket, the cage projections securing the rollers in unit-handling relation with said cage, an intermediate flat wall extending between the projections at each side of the cage, said intermediate walls being spaced apart through a distance slightly exceeding the roller diameter and extending through a distance as great as the radial depth of one of said shoulders, and the opposed intermediate walls of each pocket being uniformly spaced from and substantially parallel to a radial plane common to the cage and common to the roller in the pocket between said walls.

6. In a device of the character indicated, a pair of coaxial race rings, circumferentially spaced rolling elements therebetween, one of the race rings having an annular shoulder at the side of said rollers, a cage circumferentially spacing said rollers and located between the race rings, a pair of spaced end rings on the cage, peripherally spaced bridge members secured to and between the rolling elements and provided therewith with peripherally spaced roller receiving pockets, spaced parallel walls respectively extending on adjacent bridge members at each side of a roller through a distance as great as the radial depth of said shoulder, laterally projecting portions on each bridge member respectively merging with the ends of each of said side walls and retaining each roller in its pocket in unit-handling relation with the cage.

7. In a device of the character indicated, a pair of race rings, circumferentially spaced rolling elements therebetween, one of the race rings having a pair of axially spaced annular shoulders between which the rollers are received, a cage for circumferentially spacing said rollers, a pair of spaced end rings on said cage, circumferentially spaced bridge members secured to and between the ends rings and providing therewith peripherally spaced roller receiving pockets, each pair of adjacent bridge members having opposed walls parallel to a radial plane of the cage between said walls, said walls being spaced to closely receive and guide a roller therebetween for movement radially of the cage, through a distance slightly greater than the radial depth of one of said shoulders, and projecting portions on each bridge member laterally extending towards a roller, said projecting portions being respectively located at the ends of said opposed walls in merging relation therewith and holding each roller in its pocket in unit handling relation with the cage.

8. In a device of the character indicated, a pair of inner and outer race rings, rolling elements in rotatable engagement with both race rings, one of said race rings having a pair of axially spaced annular shoulders between which the rollers are received endwise, a cage between the race rings and circumferentially spacing said rollers, a pair of spaced end rings on said cage, peripherally spaced bridge members secured to and between the end rings and providing therewith circumferentially spaced roller receiving pockets, opposed flat bridge member walls at the sides of each pocket and located parallel to an intermediate radial plane of the cage through said pocket, the flat walls of each pocket closely receiving and guiding a roller therebetween and being of a length radially of the cage exceeding the radial depth of one of said shoulders, a lateral bridge member projection at the top of each pocket and having an arcuate face merging with one of the bridge member walls and engageable with a pocketed roller, said arcuate faces having substantially the same curvature as and supported by said rollers to maintain the cage in radially spaced relation to both race rings, a lateral projection on each bridge member at the bottom of each pocket and having an arcuate face of substantially the same curvature as that of the adjacent roller and merging with the flat bridge member wall, and said projections retaining the rollers in unit-handling relation with the cage.

References Cited in the file of this patent

UNITED STATES PATENTS

| 1,426,038 | Burkholder | Aug. 15, 1922 |
| 1,765,648 | Bott | June 24, 1930 |
| 1,884,299 | Searles et al. | Oct. 25, 1932 |
| 2,044,663 | Brodin | June 16, 1936 |

FOREIGN PATENTS

| 230,553 | Switzerland | Apr. 1, 1944 |
| 280,942 | Great Britain | Feb. 23, 1928 |
| 424,712 | Germany | Feb. 1, 1926 |